United States Patent [19]

Marwood

[11] Patent Number: 4,799,182

[45] Date of Patent: Jan. 17, 1989

[54] CELLULAR FLOATING-POINT SERIAL PIPELINED MULTIPLIER

[75] Inventor: Warren Marwood, Fairview Park, Australia

[73] Assignee: The Commonwealth of Australia, Canberra, Australia

[21] Appl. No.: 882,935

[22] PCT Filed: Oct. 16, 1985

[86] PCT No.: PCT/AU85/00249

§ 371 Date: Jun. 16, 1986

§ 102(e) Date: Jun. 16, 1986

[87] PCT Pub. No.: WO86/02474

PCT Pub. Date: Apr. 24, 1986

[30] Foreign Application Priority Data

Oct. 16, 1984 [AU] Australia ............................. PG7661

[51] Int. Cl.⁴ .............................................. G06F 7/52
[52] U.S. Cl. ..................................... 364/748; 364/754
[58] Field of Search ...................... 364/748, 754, 757

[56] References Cited

U.S. PATENT DOCUMENTS

| 3,725,649 | 4/1973 | Deerfield | 364/748 |
| 3,871,578 | 3/1975 | Van De Goor et al. | 364/748 |
| 4,013,879 | 3/1977 | Bornmann et al. | 364/757 |
| 4,283,770 | 8/1981 | Stewart | 364/757 |
| 4,493,048 | 1/1985 | Kung et al. | 364/754 |
| 4,639,857 | 1/1987 | McCanny et al. | 364/200 |

FOREIGN PATENT DOCUMENTS 2162345 1/1986 United Kingdom ................ 364/757
2166272 4/1986 United Kingdom ................ 364/757

OTHER PUBLICATIONS

The Radio and Electronic Engineer, Vol. 49, No. 11, issued Nov. 1979 (UK) Pekmestzi et al., "*Cellular two's Complement Serial-Pipeline Multipliers*", pp. 575–580.

*Primary Examiner*—Gary V. Harkcom
*Assistant Examiner*—Tan V. Mai
*Attorney, Agent, or Firm*—Cushman, Darby & Cushman

[57] ABSTRACT

A cellular floating-point serial pipelined multiplier arranged to accept two synchronous digit serial data streams in floating-point format and to output one identically formatted stream is the floating-point product of the synchronous input members. The multiplier includes a delay circuit (1) for the X operand and a digit re-ordering/delay circuit (2) for the Y operand connected to a pipelined addition circuit (3) which outputs the product through a delay cell (6). A MODE control signal propagation and generation circuit (4) is also connected to the pipelined addition circuit (3) and to the digit re-ordering/delay circuit (2), and a cell differentiation circuit (5) is connected to control the pipelined addition circuit (3) and the digit re-ordering/delay circuit (2) and the X operand delay circuit (1).

11 Claims, 10 Drawing Sheets

A FUNCTIONAL SCHEMATIC OF ANY ARBITRARY LENGTH FLOATING-POINT MULTIPLIER ARRAY

FIG. 2  PROPAGATION OF THE "MODE" SIGNAL THROUGH A FOUR CELL ARRAY FOR OPERANDS CONSISTING OF A BIT MANTISSA AND A THREE BIT EXPONENT

A FUNCTIONAL REPRESENTATION FOR THE ARRAY OF FIGURE 9 DRIVEN BY THE SAME "MODE" SIGNAL AS FIGURE 6 SHOWING THE TIME AND SPACE DISTRIBUTION OF THE MULTIPLICATION, ADDITION AND DELAY OPERATIONS.

D+  A DELAY OPERATOR FOR AN EXPONENT BIT)
Dx  A DELAY OPERATOR FOR A MANTISSA BIT )
+   AN ADDITION OPERATION                ) -A
×   A MULTIPLICATION OPERATION           )

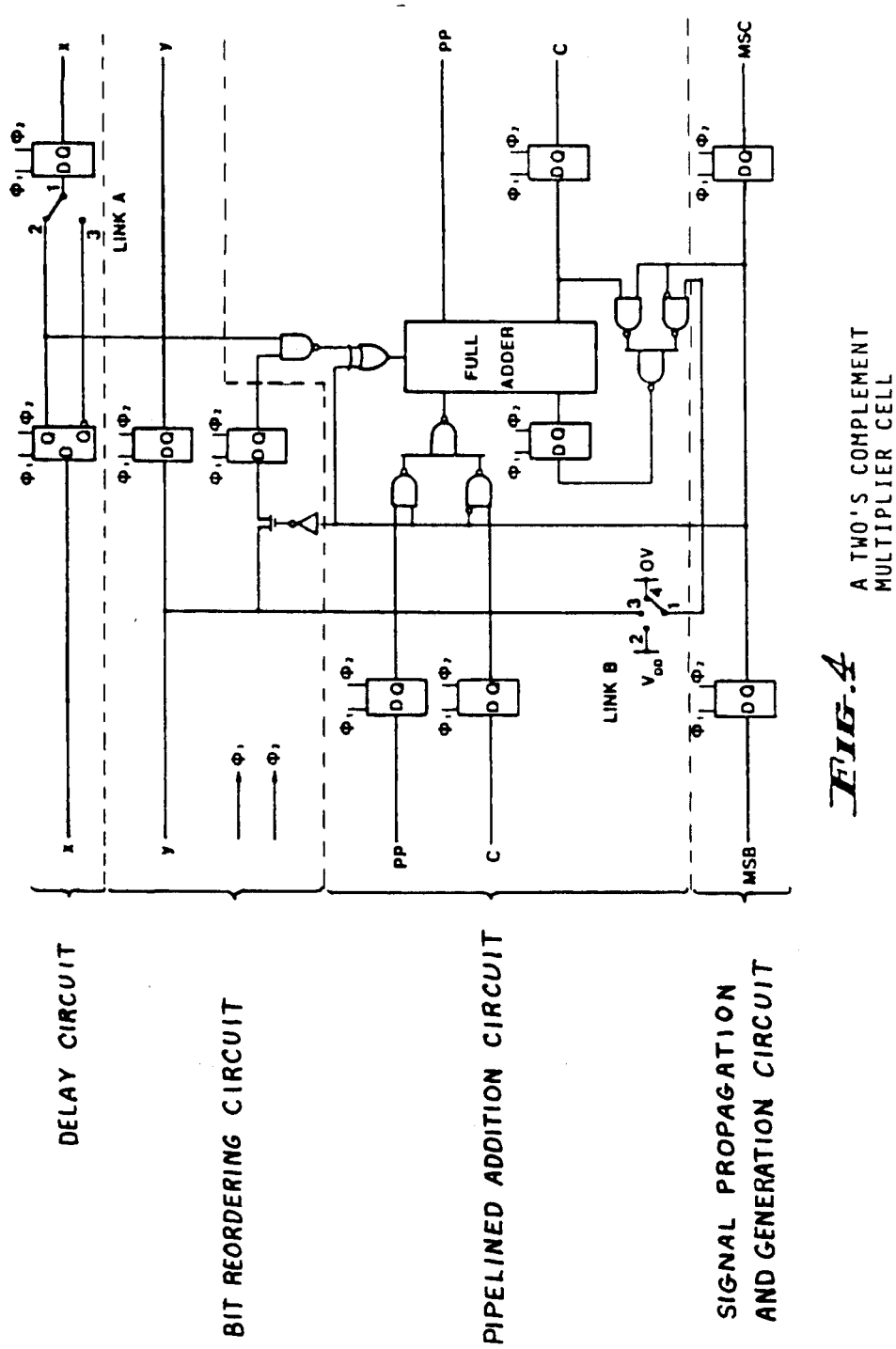
FIG. 4  A TWO'S COMPLEMENT MULTIPLIER CELL

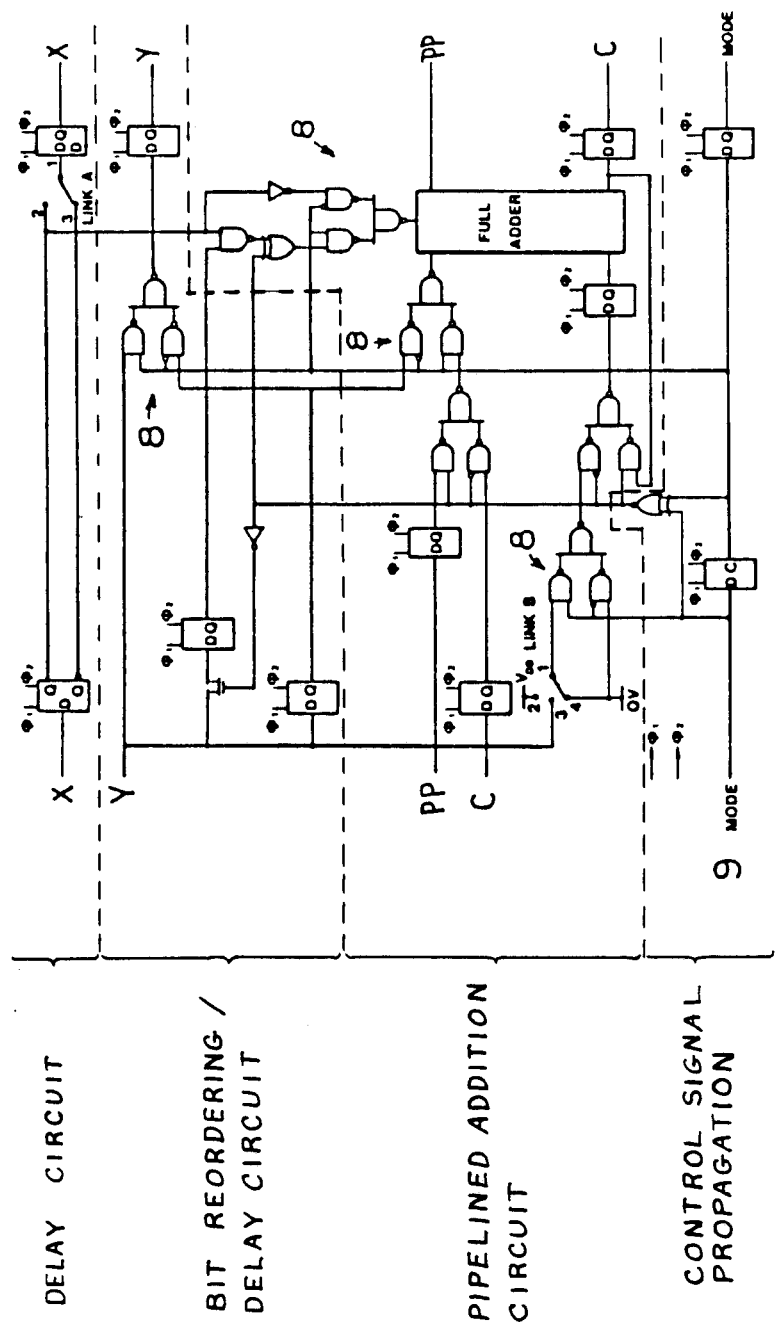

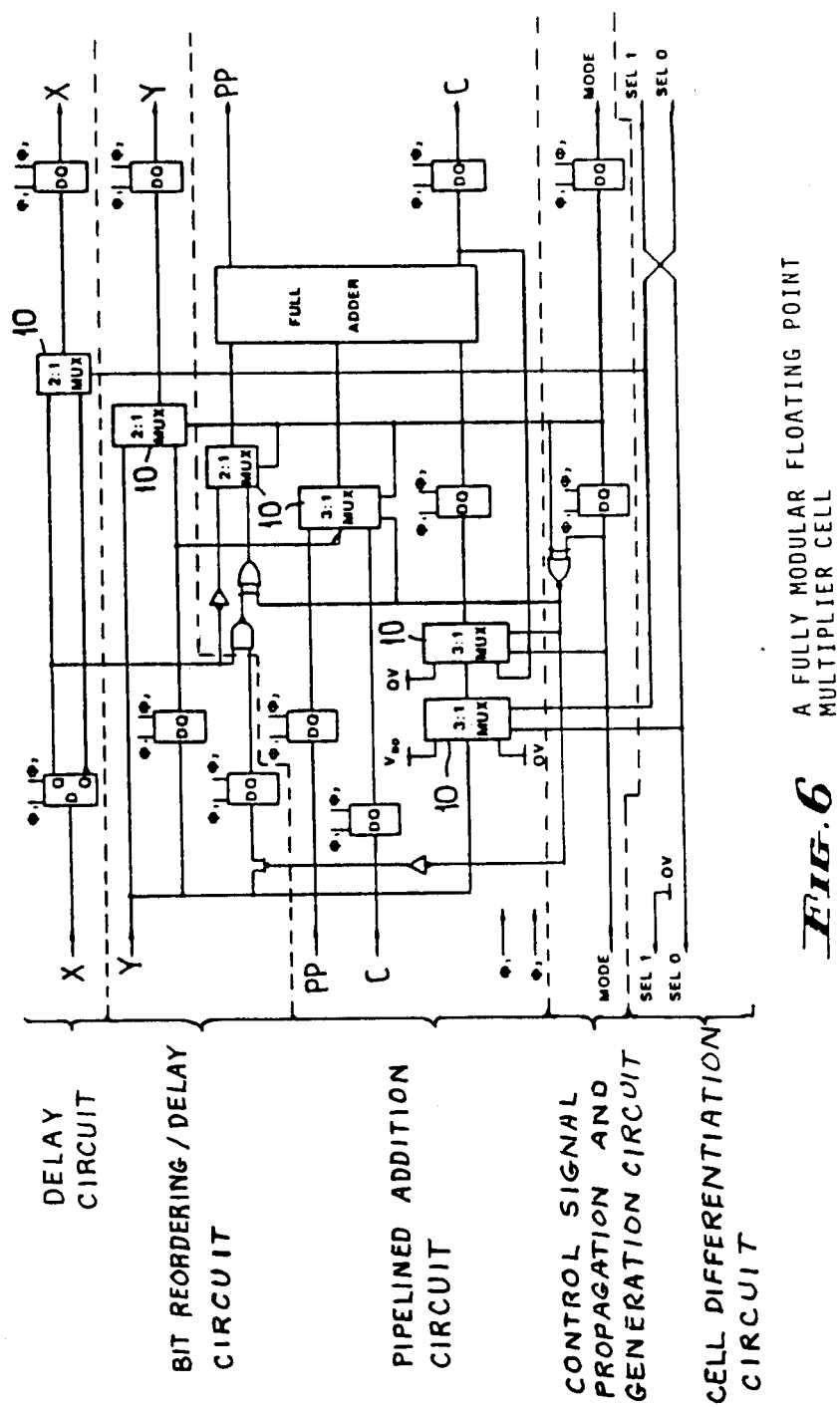
FIG. 6  A FULLY MODULAR FLOATING POINT MULTIPLIER CELL

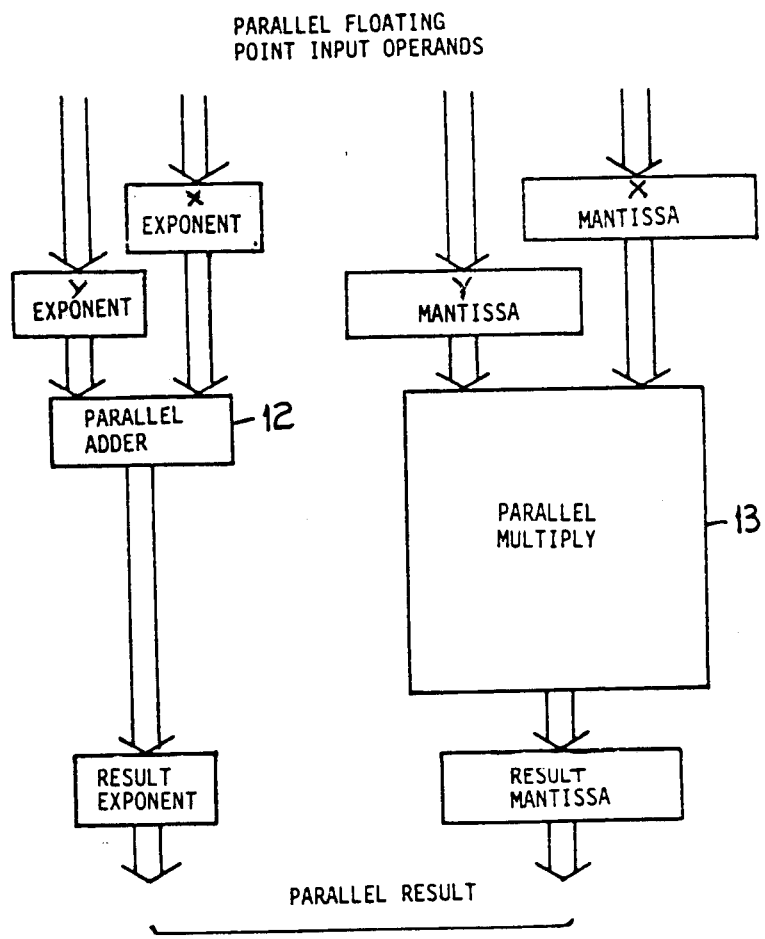
FIG. 7  BLOCK SCHEMATIC OF AN UNNORMALISED, PARALLEL FLOATING POINT MULTIPLIER

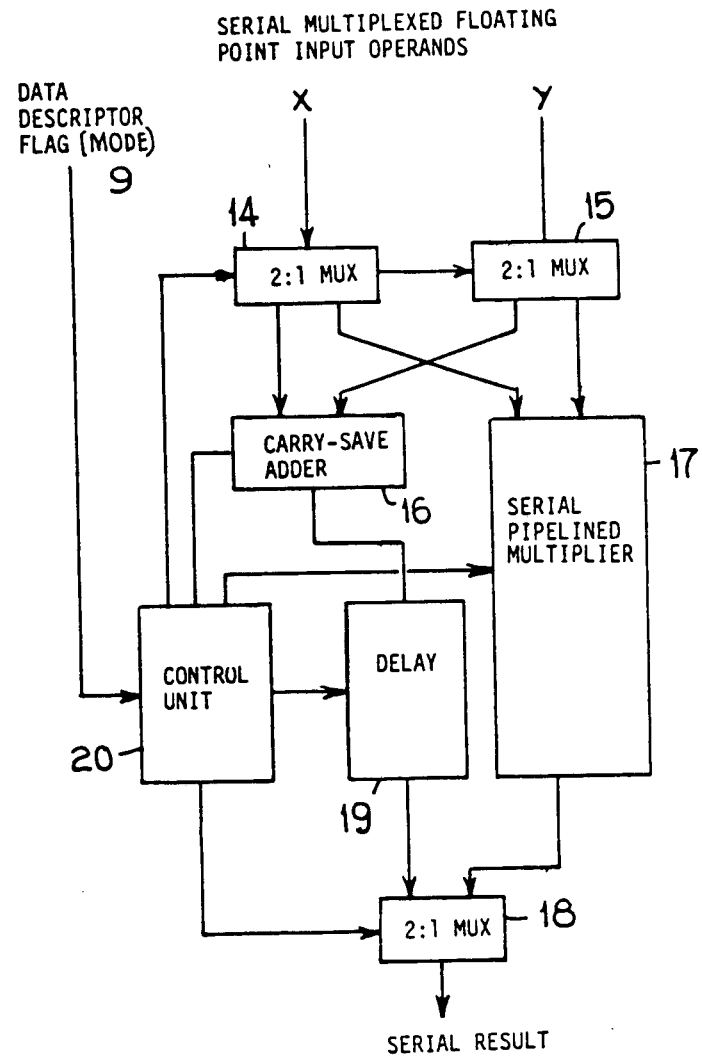
FIG. 8  BLOCK SCHEMATIC OF A CONVENTIONAL APPROACH TO THE CONSTRUCTION OF A BIT-SERIAL FLOATING-POINT MULTIPLIER

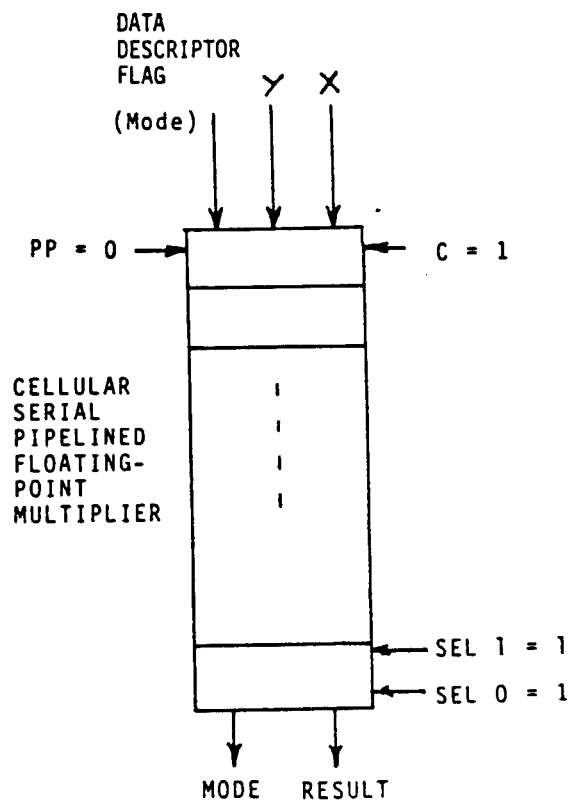
FIG. 9  BLOCK SCHEMATIC OF A CELLULAR SERIAL-PIPELINED FLOATING-POINT MULTIPLIER

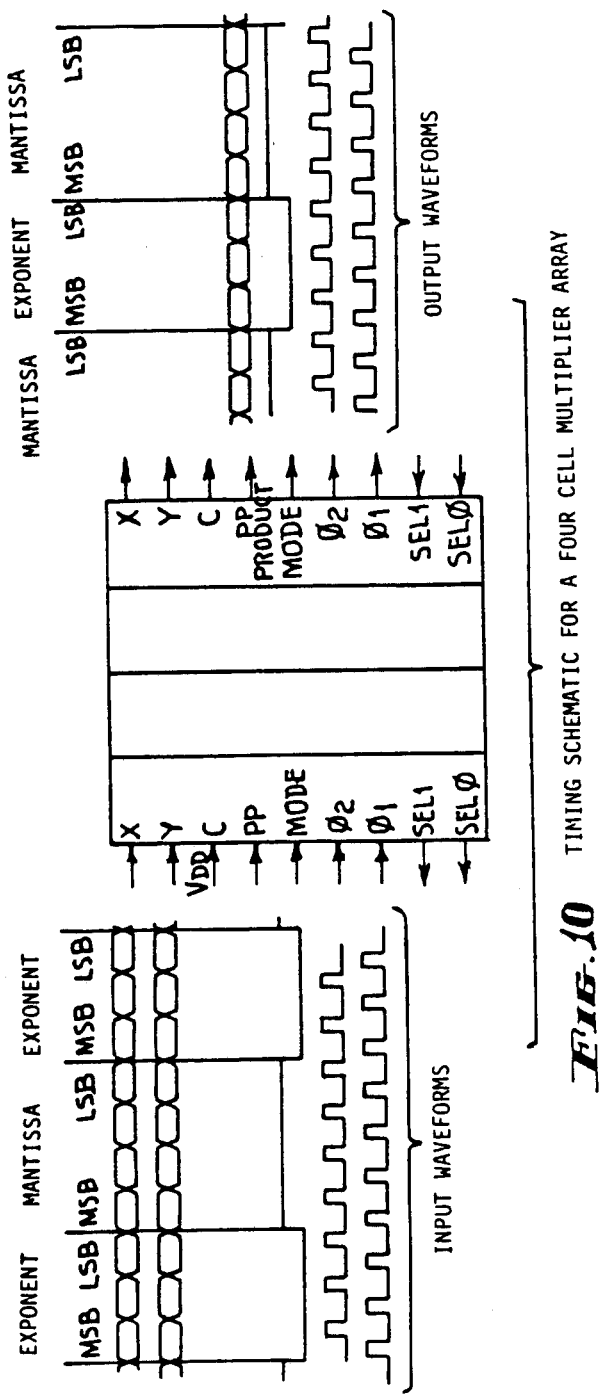
FIG. 10  TIMING SCHEMATIC FOR A FOUR CELL MULTIPLIER ARRAY

CELLULAR FLOATING-POINT SERIAL PIPELINED MULTIPLIER

BACKGROUND OF THE INVENTION

1. Field of the Invention

This invention relates to a floating-point serial-pipelined multiplier. More particularly, the present invention allows both addition and multiplication to be performed in one array of cells by delaying the Y operand, whereas the exponent propagates through the delay unchanged in the addition mode. This allows re-ordering of the mantissa digits for the multiply mode.

2. Description of the Related Art

Architectures well-matched to the computationally intensive task of real-time SONAR signal processing have been proposed by Whitehouse and SPEISER (1981) based on the systolic techniques of KUNG (1979). These architectures are characterised by arrays of identical, limited capability systolic processing elements (SPE's) with minimum complexity nearest neighbour interconnections which allow a large number of parallel arithmetic operations to occur. However, direct handling of the large-order matrices typical of SONAR applications is difficult. Physically realisable systolic arrays are currently of limited size and partitioning of the matrix computation is mandatory. This partitioning diminishes the benefits of the systolic approach.

A design methodology which minimises the partitioning problem is the bit-serial approach proposed by LYON (1981). It is based on minimum area serial data paths and fixed-point serial processing elements and allows many more processing elements to be included in a systolic array. For SONAR, however, the use of fixed-point arithmetic imposes unacceptable constraints. In particular, the large dynamic ranges typical of the application can only be met indirectly by increasing the precision of the representation (i.e. the number of bits). This solution slows the achievable processing rate and incurs area overheads of O(n) where n is the number of bits in the representation. Further, number overflows must be prevented by periodic rescaling which increases quantum noise in intermediate values. The net effect is a degradation of processor throughput.

To optimise system performance a floating-point format is required. This permits both precision and dynamic range to be independently optimised, and it has been shown that it can be implemented with a methodology related to the work of LYON. Bit serial data paths and processing elements are used and an associated mode bit differentiates between mantissa and exponent.

Each multiply/accumulate SPE as defined by WHITEHOUSE and SPEISER is constructed from several registers and a multiplier and accumulator. The major element is the multiplier. Current work on floating-point multipliers for systolic processor applications such as NASH (1984) uses parallel algorithms to implement the multiplication. The problem of implementing minimum complexity units is addressed as an application of this invention.

A study of the work on serial fixed-point multipliers, originally proposed by JACKSON et al. (1968), reveals many references to their inherent capability to perform concurrently the operation $X \times Y + Z$. The present invention demonstrates a use for the addition operator which is applicable to the direct handling of time division multiplexed exponents in a serial floating-point data format. A canonic multiplication cell is described which when used in a linear array implements a serial-pipelined floating-point multiplier. For an m-bit mantissa and e-bit exponent, the area of the multiplier is O(m), independent of the exponent length. Further, the exponent length is arbitrary and allows the dynamic range to be varied during task execution.

The implications of this low complexity VLSI implementation optimised for both precision and dynamic range for real-time signal processors with computation rates in excess of 1000 million floating-point operations per second are significant.

Serial-pipelined multipliers of the general type to which the present invention is directed have attracted continuing attention for digital signal processing applications and reference may be had to a report of JACKSON, L. B., KAISER, J. F. and McDONALD, H. S. "An approach to the Implementation of Digital Filters", published in IEEE Trans. on Audio and Electroacoust., Vol. AU-16, pp. 413-21, September 1968. Further examples are LYON, R. F., "Two's Complement Pipeline Multipliers", IEEE Trans. on Comm. COM-24, pp. 418-425, 1976, also BALDWIN, G. L., MORRIS, B. L., FRASER, D. B. and TRETOLA, A. R., "A Modular, High-Speed Serial Pipeline Multiplier for Digital Signal Processing", IEEE J. Solid-State Circuits, SC-10, pp. 307-13, October 1975, and PEKMESTZI, K. Z. and PAPADOPOULIS, G. D., "Cellular two's Complement Serial-Pipeline Multipliers", The Radio and Electronics Engineer, Vol. 49, No. 11, pp. 575-580, November 1979.

Number representations have been restricted in these examples to sign-magnitude and two's complement fixed point, and none are directed to a serial floating-point multiplier of the type to which the present invention is directed. However, the implementations have varied from the direct addition of partial products to a five level re-coded Booth's algorithm. Examination of these implementations indicates that a minimum complexity design which offered most in terms of modularity was that proposed by PEKMESTZI and PAPADOPOULIS above. A brief description of a modification of this multiplier follows.

Operands are represented in two's complement notation:

$$X = -x_0 + \sum_{i=1}^{n-1} x_i 2^{-i} \qquad (2.1)$$

$$Y = -y_0 + \sum_{j=1}^{m-1} y_j 2^{-j} \qquad (2.2)$$

As the operands are less than one, the product is also less than one and can be written $$A = (X \cdot Y + 2) \bmod 2 \qquad (2.3)$$

Substituting (2.1) and (2.2) and after some algebra, $$A = [\Sigma x_i 2^{-i} \Sigma y_j 2^{-j} + y_0(\Sigma \neg x_i 2^{-i} + 2^{-n+1}) + (\Sigma \ (y_j x_0) 2^{-j} + 2^{-m+1}) + \neg(\neg x_0 y_0)] \bmod 2 \qquad (2.4)$$

where '$\neg$' represents logical negation.

Use of modulo 2 in equation (2.4) indicates that carries are not considered in the analysis.

The algorithm of (2.4) may be implemented with the basic cell of FIG. 4, for example. However, this figure differs somewhat from that presented by PEKMESTZI and PAPADOPOULIS. An additional delay element has been used for the partial product and carry terms to provide a simpler control structure. A further difference is the allowance for both operands to be serial.

A complete nxn serial-pipelined multiplier is constructed of n basic cells. Three cell types are required, corresponding to the last, second to last and other stages. Cell types are differentiated from each other by two links as shown in FIG. 4. Link positions are given in Table 1.

TABLE 1

Link positions for a k-stage multiplier array.

| | STAGE | | |
|---|---|---|---|
| | 1...K-2 | K-1 | K |
| LINK A | 1-2 | 1-3 | 1-3 |
| LINK B | 1-4 | 1-2 | 1-3 |

Operands are entered with the least significant bit first. A control signal is entered in parallel with the data such that it is low only during the entry of the most significant bit (MSB). This signal performs the following functions:

(a) Latches $Y_i$ in cell (n−i) in order to invert the order of the bits in the Y operand.

(b) Truncates the partial product sum from the preceding cell and substitutes the carry.

(c) Realises via an EXCLUSIVE-OR gate the third term of (2.4).

(d) Initialises all partial product terms to zero except in the final two stages. The second to last stage has a weight of $2^{-n}$ added, and so effects rounding instead of truncation. In the last stage the term $(y_0 2^{-n+1})$ is added.

The term $2^{-m+1}$ of (2.4) is added to the first stage by setting the carry input to that stage high and holding the partial product input low. Terms $y_0 \Sigma_\neg x_i 2^{-i}$ and $\neg(\neg x_0 y_0)$ are realised by inverting the $x_i$ in the second to last stage.

However, it is desirable to implement a serial floating-point multiplier modified for purposes of the present invention as discussed above with respect to FIG. 4.

SUMMARY OF THE INVENTION

The cellular floating-point serial pipelined multiplier according to this invention is arranged to accept two synchronous digit serial data streams in floating-point format and output one identically formatted stream which is the floating-point product of the synchronous input members. The present invention is characterised by a delay circuit for the X operand and a digit re-ordering/delay circuit for the Y operand connected to a pipelined addition circuit which outputs the product through a delay cell. The invention is further characterised by a MODE control signal propagation and generation circuit connected to the pipelined addition circuit and the digit re-ordering/delay circuit, and by a cell differentiation circuit connected to control each of the pipelined addition circuit and the digit re-ordering/delay circuit and the X operand delay circuit.

In the cellular floating-point serial-pipelined multiplier of this invention, differentiation between mantissa and exponent is achieved with an additional stream of control digits in a multiplier having modules in which the number of modules defines the number of digits in the mantissa and the number of digits in the exponent is arbitrarily greater than one. The cell structure is arranged to allow both addition and multiplication to be performed in one array of cells by use of a delay circuit for the Y operand, and the delay allows the exponent to propogate through the array unchanged in the addition mode and to support the re-ordering of the mantissa digits for the multiply mode.

BRIEF DESCRIPTION OF THE DRAWINGS

To enable the invention to be fully appreciated, the following description has reference to the accompanying drawings in which:

FIG. 4 is a diagram showing a two's complement multiplier cell, this being the basic cell for multiplication, FIG. 5 is a diagram showing an embodiment of a floating point-multiplier cell according to this invention, FIG. 6 is a fully modular floating-point multiplier cell, FIG. 7 is a block schematic of an unnormalised parallel floating point multiplier, FIG. 8 is a block schematic of a conventional approach to the construction of a bit-serial, floating-point multiplier, FIG. 9 is a block schematic of a cellular serial pipelined floating-point multiplier, and FIG. 10 is a timing schematic for a four cell multiplier array.

DETAILED DESCRIPTION OF THE PREFERRED EMBODIMENTS

Figure 1:
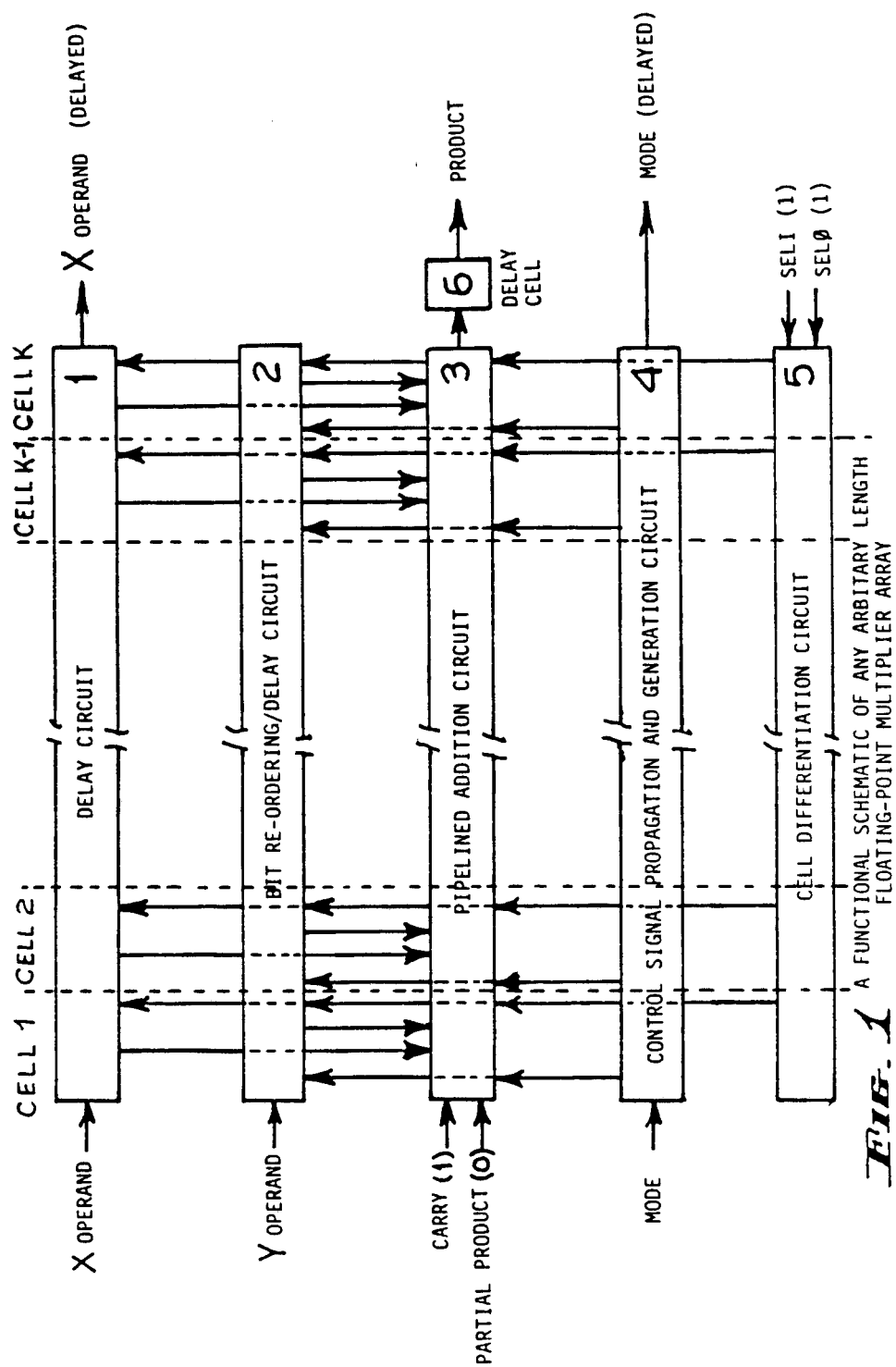
FIG. 1 is a functional schematic of an arbitrary length floating-point multiplier array.

As will be seen from the illustrations, a floating-point number F is composed of two parts, a fractional mantissa M and an integral exponent E, and can be represented as $$F = \{E, M\} \quad (3.1)$$

The real number representation R of this floating-point representation is $$R = Mb^E \quad (3.2)$$

where b is the base of the both M and E.

The product P of two floating-point numbers $F_1$ and $F_2$ can be expressed as $$P = F_1(*)F_2 \quad (3.3)$$

where (*) denotes a floating-point multiplication operation.

Substituting (3.1)

$$P = \{E_1, M_1\}(*)\{E_2, M_2\} = \{E_1 + E_2, M_1 \cdot M_2\} \quad (3.4)$$

where
+ represents addition and
· represents multiplication.

Floating-point multipliers are typically constructed in a manner detailed in FIG. 7. This schematic shows the x and y integral exponents directed to a parallel adder 12 and the fractional X and Y mantissas directed to a parallel multiplier 13. For number representations which are wider than the available data paths additional control circuitry is required to schedule the operands through the arithmetic units. Post-normalisation has not been considered.

A conventional approach to the implementation of a multiplier for a serial floating-point format is shown in schematic form in FIG. 8. Multiplexers 14 and 15 direct the integral X and Y exponents through a serial adder 16 and the X and Y fractional mantissas through a serial-pipelined multiplier 17 with the serial pipelined multiplier 17 output directed to the serial result multiplexer 18 but with the serial adder 16 output directed to the multiplexer 18 through the delay 19, all under control of the control unit 20 which receives instruction signals from the mode control 9. The spatial separation of the parallel implementation is translated to a time separation in the serial multiplier of FIG. 8. The serial adder 16 and serial multiplier 17 of FIG. 8 perform the same functional roles as the parallel adder 12 and parallel multiplier 13 of FIG. 7. Functional complexity for the serial case is increased by the distribution over both time and space of both exponent and mantissa. This increase in complexity is illustrated by the additional functional elements 14,15,18,19 and 20 of FIG. 8 which are required in addition to the serial equivalents of the parallel adder 12 and multiplier 13 of FIG. 7.

A new approach to the problem of implementing a serial floating-point multiplier is detailed in this application and it demonstrates how, as a basis for a serial-pipelined multiplier, all of the additional functional elements 14,15,18,19 and 20 of FIG. 8 can be integrated into a simple cellular structure.

Instead of multiplexers 14 and 15 separating exponent and mantissa for independent processing and subsequent combination of the result by multiplexer 18 as in FIG. 8, the multiplier structure 17 of the present invention is modified to allow both the addition and multiplication operations to be performed in one array of cells. This is possible in a serial floating-point format. The multiplier 17 cannot achieve full utilisation for arbitrary exponents as varying delays are introduced between successive mantissas as a function of the exponent lengths as shown in the timing schematic of FIG. 10.

During these delays the multiplier adders become idle in a pipe-lined sequence which propagates through the array. Use is made of the adder in the last cell during its idle state to perform exponent addition. To efficiently utilise this adder in a dual role for both multiplication and addition a delay circuit is constructed for one operand to propagate an unchanged exponent through the array in the addition mode and to re-order and store the mantissa digits in the multiplication mode.

An arbitrary length cascade of cells which directly handle a floating-point data format in this way is shown in a functional schematic form in FIG. 1. Five functional circuits 1, 2, 3, 4 and 5 are constructed. The X and Y operands are input to the delay circuit 1 and the digit re-ordering/delay circuit 2, respectively, and the outputs from each of these circuits are combined in the pipelined addition circuit 3 to form the floating-point product $X \times Y$ which is output via the delay cell 6.

The cell differentiation circuit 5 controls individual cell function. Signals entering the circuit 5 are SEL0 and SEL1 and they are both held at a logic high level. Interconnection of these signals between cells provides three independent control states to define the three cell types required for correct multiplier operation. The different cell types invert the X operand in the last cell and correctly handle the carry signals for the pipelined adders. The MODE signal, which differentiates at the multiplier input the operand mantissas and exponents, is entered into a control signal propagation and generation circuit 4. When MODE is a logic high level it defines the presence of a mantissa bit and a multiplication operation, and when low it defines an exponent and an addition. This use of the MODE bit to differentiate exponent and mantissa also allows the identification of the MSB's and is an extension of the approach adopted by LYON in the fixed-point case.

The pipelined addition circuit 3 functions in two distributed modes which propagate across the array as a function of the MODE signal. The low to high transition of this signal at a cell boundary initialises the carry inputs to the adders and begins a multiplication. Partial product information is transferred across cell boundaries in this mode. Carry information is transferred from each cell to its successor at the end of the multiplication phase when the MODE signal undergoes a high to low transition. The additional delay stage 6 at the end of the addition circuit 3 is required to re-synchronise the product with the MODE signal. The product is subject to $2k-1$ delays in a k-cell array while the MODE signal is subject to $2k$ delays. This additional delay matches both delay paths.

During the addition phase, when MODE is low, no information is transferred across cell boundaries and all cells function independently. This results in a simple addition of the operands in the last cell as required for the exponents.

The bit re-ordering/delay circuit 2 supports two data handling operations for the Y operand which are necessary to implement multiplication and addition in one iterative array. The operations:

(1) Mantissa bit reversal and storage
(2) Exponent delay synchronised with the X operand.

The delay circuit for the X operand provides two delay stages per cell and under the control of SEL0 and SEL1 inverts the data used in the last cell.

The principle of operation discussed above is illustrated by considering a particular implementation.

FIG. 5 shows a floating-point multiplier cell in accordance with the present invention. Multiplication of two n-bit mantissas is performed by an array of n cells implementing the algorithm described above. As before, three cell types are required in the array, and the cells are constructed from the basic cell by the placement of the two links shown in FIG. 5 and whose position is detailed in Table 1 above.

During operation a MODE bit is entered in parallel with the data to identify the data type (mantissa or exponent) and to select both the operation required and the nature of the delay for the Y operand. A logic high enables a multiplication operation and a logic low an addition. The delay structure of one or two delays per cell for the Y operand allows respectively the re-ordering of the Y mantissa during a multiplication and the synchronous delay of both X and Y exponents during an addition. Exponent addition is performed by the carry-save adder in the last cell. Both modes are fully pipelined. In an NMOS implementation the time penalty of this cell compared with the cell of PEKMESTZI and PAPADOPOULIS is due to one additional pass transistor in the logic preceding the full adder. A further delay present in the cell shown is due to the internal identification of the MSB. Overall cell speed can be increased by the use of independent MODE and MSB control signals.

The fully pipelined, alternating exponent and mantissa format is preserved at the output of the multiplier with the qualification that the result is not normalised. The worst case normalisation required is one bit which presents no numeric problems when the multiplier is followed by a floating-point adder as in an SPE.

A fully modular floating-point multiplier cell as illustrated in FIG. 6 has the link structure of FIGS. 4 and 5 removed and replaced with multiplexers and two control lines. Logic highs are entered from the last cell and propagate a maximum of two cells backwards along the array to perform the differentiation of cell function. The multiplexers incur a minor time penalty, but minimise the system complexity by allowing all cells to be identical. Operation of the array is identical to the multiplier discussed above.

Figure 2:
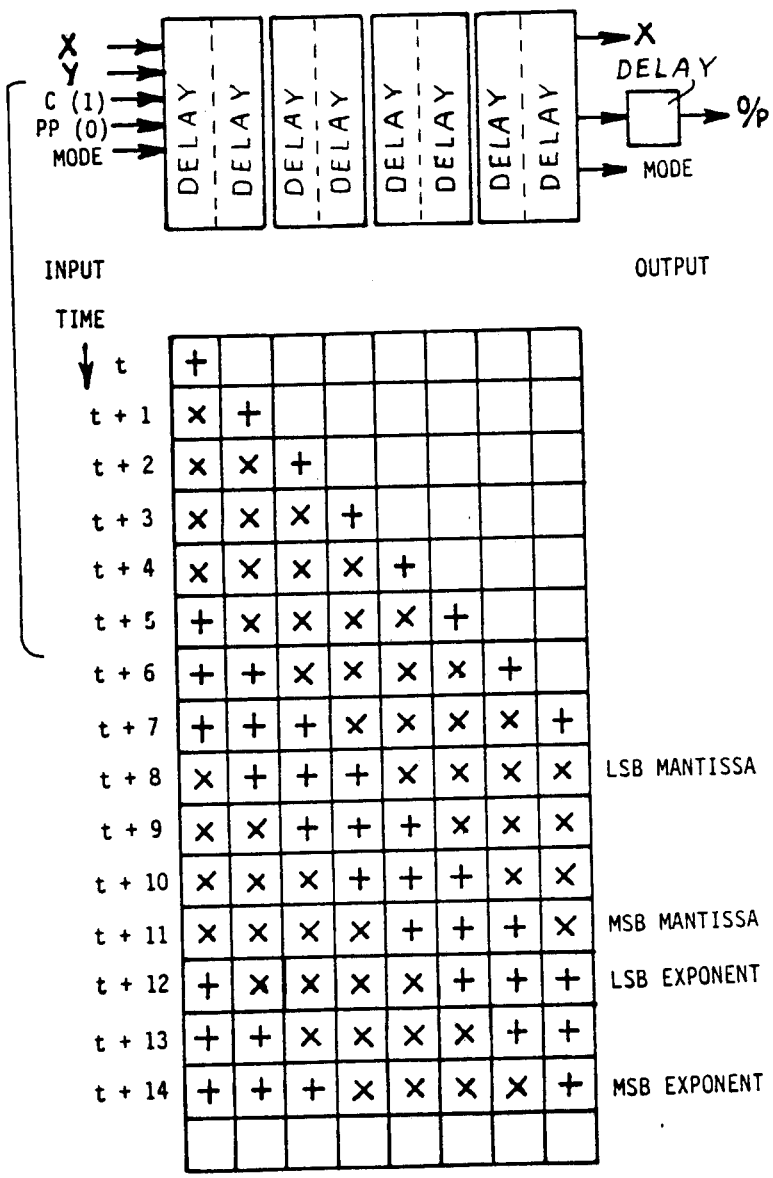
FIG. 2 shows the propagation of the MODE signal through a four cell array for operands consisting of a four bit mantissa and a three bit exponent.
Figure 3:
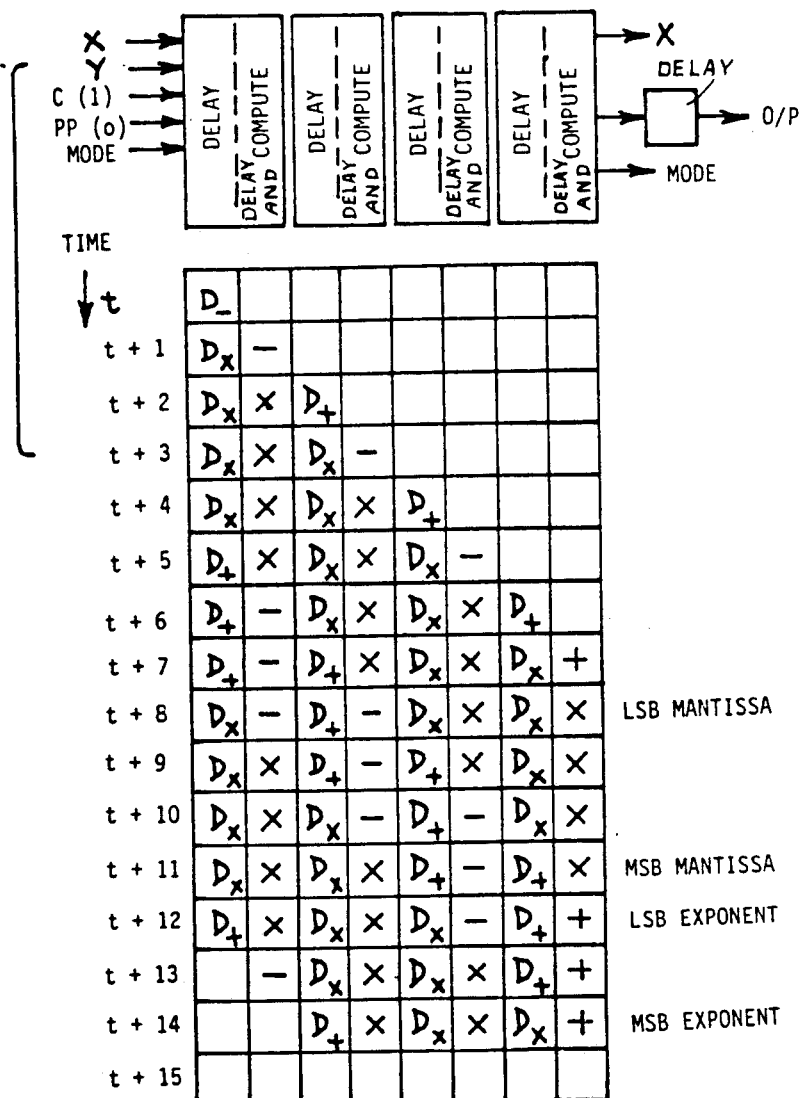
FIG. 3 is a functional representation for the array of FIG. 2 drawn to the same MODE signal as FIG. 2 showing the time and space distribution of the multiplication, addition and delay operations.

FIG. 2 shows the propagation of the MODE signal through a four cell multiplier for the case of an operand with a four bit mantissa and a three bit exponent. There are two delay stages in each cell with the arithmetic operation coinciding with the second delay. At any time instant a row of FIG. 2 describes the contents of each cell in terms of an addition or multiply symbol (exponent or mantissa respectively). As there is only one arithmetic operation in each cell, an additional diagram, FIG. 3 shows the distribution in time and position of the useful arithmetic operations carried out in the array. The delay stages are denoted by either $D_+$ or $D_x$ to indicate whether an exponent or mantissa bit is stored, and the computation stages are denoted by a multiplication, addition or subtraction operator. The subtraction operator indicates that an operation which does not contribute to the result is carried out. It can be seen from this diagram that the $4 \times 4$ multiplication is carried out with 16 multiplication operations pipe-lined across the array and the 3-bit exponent addition is carried out with 3 additions in the last cell.

In the timing schematic shown in FIG. 10 the mantissa length is equal to the number of cells, in this case shown as four, while the exponent length is arbitrarily greater than one and is shown as three for the purpose of illustration. Two-phase clocking ($\phi_1$ and $\phi_2$) has been assumed. The MODE input defines exponent and mantissa to the multiplier array, and the MODE output defines the product exponent and mantissa. A single delay stage is required at the result output to properly synchronise result and MODE signals.

The unlimited exponent range achieved with the circuit of FIGS. 5 and 6 is achieved naturally. This is an advantage of the approach.

From the foregoing it will be seen that the invention is concerned with the following:

(1) In a serial floating-point data format the multiplier for the mantissas cannot achieve full utilisation for arbitrary exponents as varying delays are introduced between successive mantissas as a function of the exponent lengths. During these delays multiplier adders become idle in a pipelined sequence which propagates through the array. Use is made of the idle adder in the last cell to carry out the exponent addition.

(2) Use of this last cell in an efficient dual role for both multiplication and addition requires a new delay structure which supports both mantissa bit re-ordering and exponent delay. The bit re-ordering/delay circuit of FIG. 1 performs these functions. The two modes are fully pipelined with no guard bits between them and are implemented with the minimum number of delay elements.

(3) Recognition that idle adders in the multiplier structure can be used to carry out exponent addition with no separate adder, together with the design of the bit re-ordering/delay circuit to implement the concept with an optimum number of delays effectively integrates the seven functional blocks in FIG. 8 into the single cellular structure of FIG. 9. This greatly simplifies the design task for a floating-point multiplier, as only a single, small cell as shown in FIG. 6 need be designed.

(4) The design of the cell differentiation circuit in FIG. 1 and associated structures in the cells to respond to the control signals provides advantages when designing arbitrary precision multipliers. The design task is minimised by requiring only one cell to be replicated.

(5) The multiplier has the unique attribute that arbitrary dynamic ranges are handled automatically and precision is controlled simply by the number of cells used. It therefore provides a minimum complexity solution to the problem of designing floating-point multipliers for arbitrary precision and dynamic range.

Floating-point arithmetic units designed for use in VLSI systolic arrays must be numerically robust. This is a consequence of the inability to handle an exception condition in a primitive SPE. For the floating-point multiplier as discussed above, however, no difficulties can arise during the processing of normalised mantissas. The only exceptions possible are due to inadequate exponent range. The proposed cell provides a solution to this representation problem by allowing the number of bits in the exponent to be dynamically varied.

Guard digits can be carried in the exponents, and the number of digits is increased as required to prevent overflow during computation. There is a lower limit of one digit with no upper limit. This dynamic exponent control allows optimisation of both computation time and storage requirements.

From the foregoing it will be appreciated that a serial floating-point multiplier has been provided in which the area-time product of the bit-serial multiplier approaches the optimum, and the overall complexity is minimised by a fully modular design. An unlimited exponent range is a feature of the implementation which offers an unusual ability to handle a class of numerical problems with large dynamic ranges.

The claims defining the invention are as follows:

I claim:

1. A cellular floating-point serial pipe-lined multiplier arranged to accept two synchronous digit serial data streams having bits representing mantissas and exponents of respective X and Y operands in floating-point format and to output one identically formated data stream which is the floating-point product of the synchronous X and Y operands, comprising:
an X operand delay circuit for delaying said X operand to provide a delayed X operand;
a bit re-ordering/delay circuit for reversing and storing a bit of a mantissa of said Y operand and delaying an exponent of said Y operand so as to be in time synchronism with the exponent of said delayed X operand;
pipe-lined addition means for adding the exponent of said delayed X operand and the delayed exponent of said Y operand in an addition mode and for multiplying the mantissa of said delayed X operand and the bit-reversed Y operand in a multiplication mode so as to produce said floating-point product; and mode control signal propagation and generation means for identifying whether each received bit of said X and Y operands are mantissa or exponent bits and for outputting a mode signal for respectively placing said pipe-lined addition means and said bit re-ordering/delay circuit in said multiplication mode or said addition mode in response to said identification for each bit.

2. The multiplier of claim 1, further comprising a delay cell for delaying said floating-point product so as to synchronize said multiplication product with said mode signal.

3. The multiplier of claim 1, wherein said X operand delay circuit, said bit re-ordering/delay circuit, said pipe-lined addition means and said mode control signal propagation and generation means are constituted by a connected linear array of identical cells for serially processing each received bit of said X and Y operands, the first cell of said linear array receiving respective received bits of said X and Y operands and the last cell of said linear array outputting said floating-point product.

4. The multiplier of claim 3, further comprising a cell differentiation circuit for controlling said X operand delay circuit, said bit re-ordering/delay circuit and said pipe-lined addition means, said cell differentiation circuit differentiating between the mantissa and the exponent bits of said X and Y operands with an additional stream of control bits in a multiplier having cells in which the number of cells defines the number of digits in the mantissa and the number of digits in the exponent is set at a predetermined number greater than one.

5. The multiplier of claim 4, wherein each cell is arranged to allow both said addition and said multiplication modes to be performed in one array of cells by delaying the Y operand so as to allow the exponent of the Y operand to propagate through the array unchanged in said addition mode and to allow re-ordering of the mantissa bits of said Y operand for said multiplication mode.

6. The multiplier of claim 3, wherein the function of each cell is controlled by link positions of one or more link switches.

7. The multiplier of claim 3, wherein the function of each cell is controlled by multiplexers which selectively apply control signals to each cell, said multiplexers being activated by select signals applied to said last cell which have propagated through said array towards said first cell.

8. The multiplier of claim 7, wherein logic high signals are entered into said last cell as said select signals, said select signals propagating a maximum of two cells along the array towards said first cell to thereby differentiate the functions of each cell.

9. The multiplier of claim 3, wherein said X and Y operands are inputted into said first cell of said linear array least significant bits first so that the function of each of said cells may be controlled by a two-level control signal entered in parallel and propagated synchronously with said X and Y operands, said parallel control signal being in a first state when associated with the exponent and in a second state when associated with the mantissa of said X and Y operands.

10. The multiplier of claim 3, wherein the mantissas and exponents of said X and Y operands are arranged in alternating sequence so as to cause the pipelined addition means at each cell to become idle during the passage of the exponents, except for the adder in said last cell, which sums the exponents of said X and Y operands to form the exponent of said floating-point product.

11. The multiplier of claim 10, wherein the mantissas and exponents of said X and Y operands are arranged in successive bit sequence with no guard bits therebetween.

* * * * *